United States Patent

[11] 3,598,293

| [72] | Inventor | Ronald H. D. F. Lee<br>Berkhamsted, England |
|---|---|---|
| [21] | Appl. No. | 827,738 |
| [22] | Filed | May 26, 1969 |
| [45] | Patented | Aug. 10, 1971 |
| [73] | Assignee | Cooper, McDougall & Robertson Limited<br>Berkhamsted, England |
| [32] | Priority | May 28, 1968 |
| [33] | | Great Britain |
| [31] | | 25581/68 |

[54] DISPENSING DEVICE
6 Claims, 3 Drawing Figs.

[52] U.S. Cl. .................................................. 222/327,
222/391
[51] Int. Cl. .................................................. G01f 11/22
[50] Field of Search .................................. 222/391,
390, 326, 327

[56] References Cited
UNITED STATES PATENTS

| 2,602,571 | 7/1952 | Sherbondy | 222/327 |
| 2,731,176 | 1/1956 | Crewe | 222/326 |
| 3,319,839 | 5/1967 | Cox | 222/327 |

*Primary Examiner*—Samuel F. Coleman
*Assistant Examiner*—Norman L. Stack, Jr.
*Attorney*—Delio and Montgomery ABSTRACT: A device for dispensing liquid or semiliquid material from a screw-threaded cylindrical reservoir having a discharge opening and a piston, which device comprises a supporting structure having an actuating member arranged to move between two predetermined points to cause axial movement of said piston and the discharge of a dose of material from said reservoir. The device includes an operating member mounted on said supporting structure having an inoperative position and an actuated position and the operating member is arranged to impart movement to said actuating member between the said predetermined points. The device is provided with a member for locking the operating member in said actuated position.

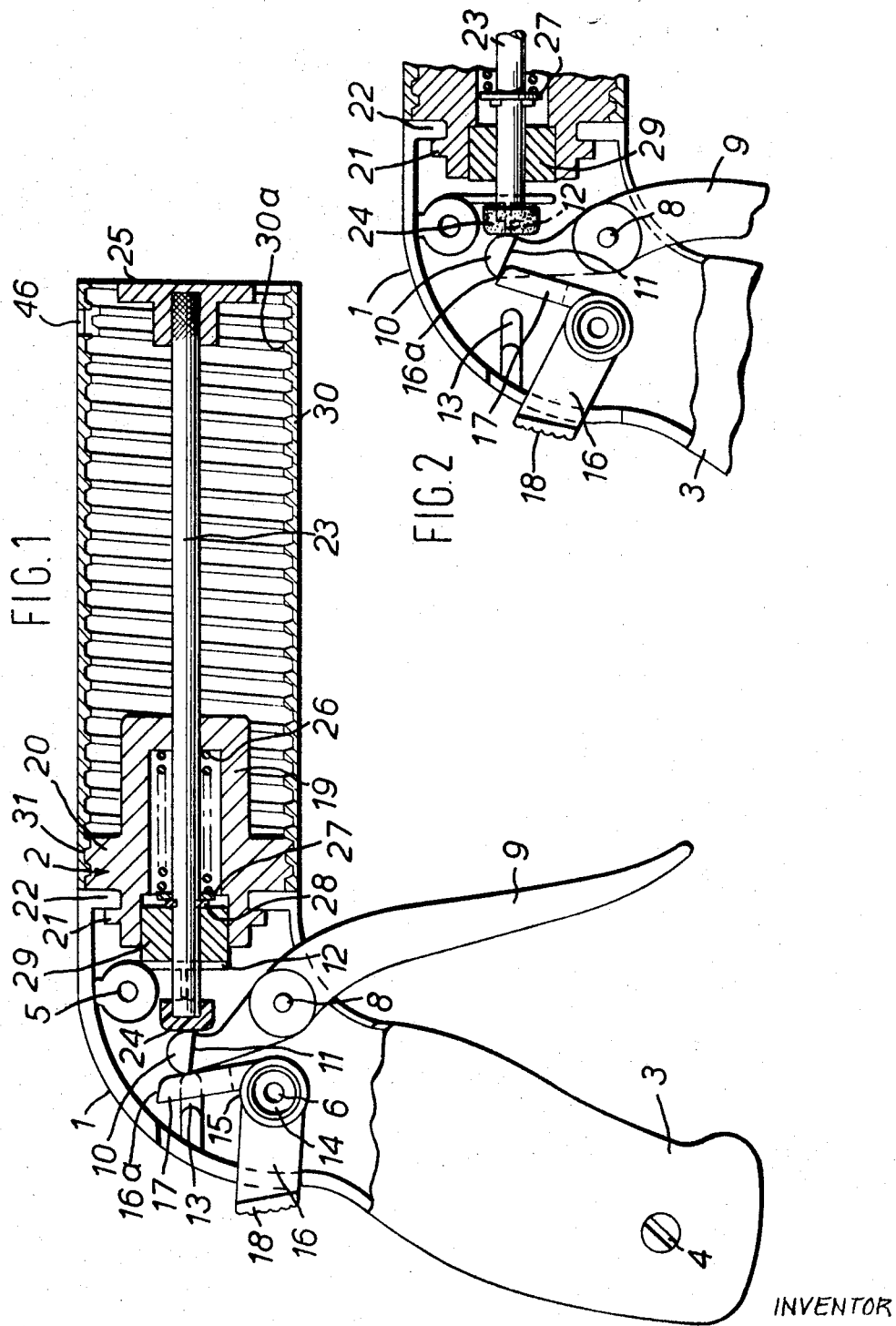

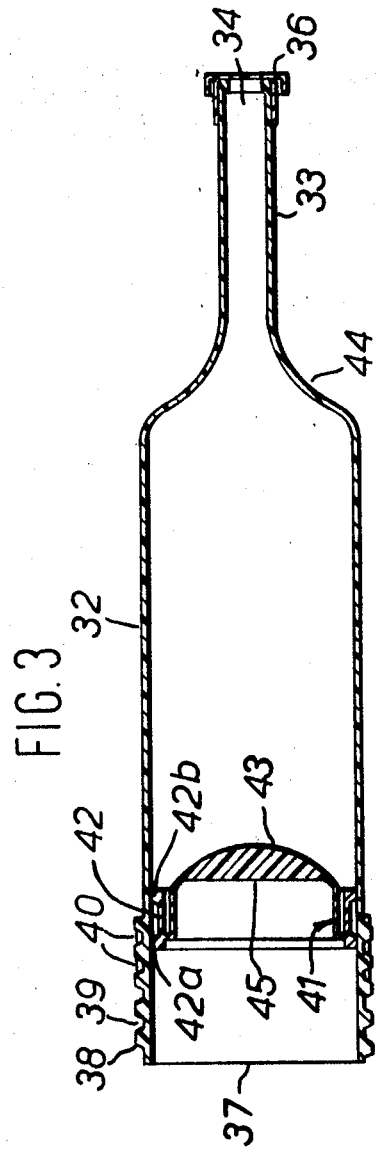

DISPENSING DEVICE

This invention relates to a dispensing device for liquid or semiliquid substances.

U.K. patent specification No. 1,118,081 described a dispensing device for liquid or semiliquid substances which has found application for dispensing unit doses of medicaments and like substances to domestic and farm animals. In that specification there is described a dispensing device comprising a manually operable trigger for moving a shaft and its head through a predetermined distance within an internally screw-threaded barrel. The device is used in cooperation with an externally screw-threaded cylindrical reservoir of liquid or semiliquid material having a discharge nozzle and a piston. In use, the device is taken in hand by the operator and the trigger depressed. The cylindrical reservoir is then screwed down the barrel until the shaft head engages the piston of the reservoir and a small quantity of material is discharged through the nozzle. This material is removed and the trigger released. The device is now loaded and ready for selecting unit doses of material from the reservoir. This is achieved by further screwing the reservoir down the barrel for a predetermined distance depending on the required dose. Operation of the trigger then moves the shaft head into engagement with the piston in the reservoir to force it along the cylindrical reservoir for a distance predetermined by the required dose, and an unit dose of material is discharged from the reservoir through the nozzle.

In practice this device has found a most useful application in dispensing medicaments in the form of liquids or semiliquids to domestic animals. In contrast to other dispensing devices, the aforementioned device is capable of dispensing a range of highly accurate doses of materials. A change in the size of the dose is achieved by varying the extent of axial movement of the reservoir relative to the barrel prior to a discharge. In this way the trigger/shaft mechanism requires no adjustment for a change of the dose size, and a mechanism which is simple and reliable in operation can be employed. Some other types of dispensing devices are designed to discharge material over a range of doses, the dose size being changed by altering the stroke of the piston which requires adjustment of the mechanism. The complexity of the mechanism necessary to achieve this frequently leads to the discharge of inaccurate doses, and even a cumulative dosing error, with increasing wear of the mechanism. Such errors are inherent in these types of devices and are distinct from errors attributable to the operator.

The aforementioned device has therefore found most valuable application in dispensing medicaments which are toxic in doses not substantially exceeding the therapeutic dose, that is to say, substances having a low therapeutic index. Such substances can be readily administered by the aforementioned device without the danger of inaccurate dosing and consequential toxicity or death of the administered animal.

It has now been found however that the aforementioned device has one serious drawback in its practical application to the dosing of animals. When the operator initially screws the cylindrical reservoir into the barrel, he frequently omits to depress the trigger. The consequence of this failure is that the initial dose of material is capable of being far in excess of the required dose, with consequent overdosing of the animal to which the medicament is being administered. If the operator is unaware that this has occurred, then one or more of the subsequent attempts at administration would result in no discharge of medicament. In order to minimize failure by the operator to depress the trigger during the loading operation, the present invention provides for a trigger-locking member in the aforementioned device for locking the trigger in the actuated position. In using the device of the present invention, the operator will therefore have an element—the trigger-locking element—requiring a separate and positive operation in the loading sequence; and it is less likely for the operator to overlook this element in the sequence of loading operations than the mere requirement of actuating the trigger. In this manner the dangers of overdosing are minimized.

According to the present invention there is provided a device for dispensing liquid or semiliquid materials from a screw-threaded cylindrical reservoir having a discharge opening and a piston, which device comprises a supporting structure having an actuating member arranged to move between predetermined points and to cause axial movement of the piston of the reservoir to discharge material from the reservoir upon actuation of an operating member, a member for locking the operating member in the actuated position, and a tubular structure mounted on the supporting structure and having a screw thread of uniform pitch arranged for screw-threaded engagement with the reservoir whereby relative rotation of the tubular structure and the reservoir causes relative axial movement between them, predetermining the dose to be discharged from the reservoir upon subsequent actuation of the operating member.

In another aspect the present invention provides a device for dosing animals with liquid or semiliquid material including a cartridge in the form of a cylinder for the material to be dispensed having a discharge opening at one end and an externally screw-threaded portion at its other end, a free piston arranged to slide within the cylinder to eject the substance through the discharge opening, the base diameter of said screw-threaded portion being not less than the external diameter of the remaining part of said cylinder, a supporting structure in the form of a gun having an internally screw-threaded barrel portion engaging said screw-threaded portion of said cylinder whereby rotation of said cylinder relative to said barrel portion causes axial movement of said cylinder relative to said barrel, an actuating member on said supporting structure having predetermined movement axially of said cylinder independently of but capable of acting on said free piston, an operating member arranged to impart said predetermined axial movement to said actuating member upon movement of said operating member from an inoperative position to an actuated position, and a bellcrank lever pivoted to said supporting structure to lock said operating member in said actuated position.

The invention will now be described and illustrated by the following embodiment and the accompanying drawings.

FIG. 1 is a side view of a section through a device of the present invention.

FIG. 2 is a side view of a broken section through the same device with the trigger lever in the actuated position and the trigger-locking mechanism engaged.

FIG. 3 shows the side view of a section of a cartridge reservoir for use with the device illustrated in FIG. 1.

Referring to FIGS. 1 and 2, the device comprises a supporting structure 1 and a handle 3 formed in two cooperating similar parts clamped together by bolts at 4, 5 and 6, to a thrust structure 2.

The thrust structure 2 comprises a housing 19 having a forward flange 20 and a back flange 20 and a back flange 21 cooperating with an internal flange 22 of the supporting structure 1 in actuating a member such as shaft 23. A shaft 23, having a pad 24 and a shaft head 25, can slide axially relative to the housing 19, and has a helical spring 26 urging the shaft 23 towards the handle 3. The spring 26 bears against the housing 19 and against a washer 27 which is restrained by a circlip 28 about shaft 23. An internal sleeve 29 slidingly fits on the shaft 23 and centers it in the housing 19. Axial sliding movement of sleeve 29 in the housing 19 towards handle 3 is limited by forward stop 12.

A tubular structure comprises an internally threaded tube 30, which has a screw thread 30a of uniform pitch, locked on to the thrust structure 2 by screw threaded engagement at 31, and has a hole or slot 46. An arrow head (not shown) lies on the exterior surface of the tube 30 at its forward end to act as a datum mark for selecting the dose.

Referring to FIG. 3, a cartridge reservoir is made of a moulded plastic in the form of a cylinder 32 having a nozzle 33 and a discharge outlet 34. When in use the cylinder 32 contains the liquid or semiliquid material (not shown) to be dispensed and is protected from contamination by a cap 36. The cylinder 32 has an opening 37, which when the cylinder 32 is not in use, would normally be closed by a screw threaded cap (not shown). A part of the exterior of the cylinder is formed in a screw thread 38 of even pitch to cooperate with the screw thread 30a of the internally threaded tube 30, and to cooperate with the cap (not shown) over opening 37. In the screw thread 38, the groove 39 has upstanding webs 40 of plastic material at four positions, enabling the crest of the screw head 30a of the internally threaded tube 30 to deform the webs 40 and form a tight fit upon screwing the cylinder 32 in the threaded tube 30 of FIG. 1, and thus take up the manufacturing tolerances between threads 38 and 30a.

In the cylinder 32, there is a piston 41 having a skirt 42 with upstanding annular rims 42a and 42b to ensure a tight fit with the bore of the cylinder 32 and to prevent escape of its contents through opening 37. The piston has a forward curved surface 43 to ensure maximum displacement of contents of the cylinder 32 from the nozzle region 44; and has radial ribs 45 to strengthen the curved surface 43 and form a flat plane for shaft head 25. When in use the part of the interior of the cylinder 32 between the discharge outlet 34 and the forward-curved surface 43 of the piston 41 is filled with the substance to be dispensed. Conveniently the cylinder 32 has external longitudinal lines (not shown) spaced radially apart for cooperating with the datum mark to determine the extent of axial displacement of the cylinder 32 along the tube 30, and hence the dose to be discharged. After a number of doses have been administered and material remains only in nozzle region 44 of the cylinder 32, the external lines (not shown) on the cylinder 32 disappear within the tube 30, and the hole or slot 46 in the tube 30 enables the operator to see the lines on cylinder 32.

Referring to FIGS. 1 and 2, an operating member such as 9, is pivoted at 8, and has a T-shaped end 10 having a face 11. The forward and back arcuate movement about pivot 8 of T-shaped end 10 is limited by forward stop 12 and backstop 13, formed rigid with supporting structure 1. Mounted at a pivot 14 on handle 3 is a bellcrank lever 15 which serves as a trigger lock. Bellcrank lever 15 comprises an arm 16, a bifurcated arm 17 and a thumb pad 18. When the device is not in use the trigger lever 9 is held in the position shown in FIG. 1 by the spring 26 acting on shaft 23 against the trigger lever 9.

The trigger lever 9 is arranged to be actuated by one or more fingers of the hand of the operator supporting the device by the handle 3 so as to move the shaft 23 to the right in FIG. 1 to the position shown in FIG. 2. This movement is limited by engagement of T-shaped end 10 with backstop 13 and forward stop 12. Thus for each actuation of the trigger lever 9 by an operator between its two limiting positions, the shaft 23, and hence the shaft head 25, move from one predetermined position to another predetermined position.

When the apparatus is in use, the handle 3 is gripped by the hand of the operator and the trigger lever 9 is depressed. The T-shaped end 10 pivots about pivot 8, engages pad 24, and thrusts shaft 23 forward (towards the right of the drawing in FIG. 1), until the T-shaped end 10 engages the forward stop 12. The thumb pad 18 is then actuated by the operator to move the arm 16 in an arcuate path about pivot 14 and to lock forward faces 16a of bifurcated arm 17 with face 11 of T-shaped end 10 of trigger lever 9. The device is then in the condition shown in FIG. 2. with the trigger lever 9 locked in the actuated position at the limit of the forward movement of shaft 23. The cap 34 and the cap (not shown) over the opening 37 of the cylinder 32 are removed and the cylinder 32 screwed down into the threaded tube 30 by relative rotation of the two parts 30 and 32, until the shaft head 25 engages piston 41. By further relative rotation of cylinder 32 in tube 30, the shaft head 25 forces piston 41 along cylinder 32 (towards the right in the drawing of FIG. 3), thus forcing material in the cylinder 32 towards and through the discharge outlet 34. The relative rotation of cylinder 32 and tube 30 is conveniently terminated when this has been achieved and the arrowhead (not shown) on the tube 30 is aligned with one of the longitudinal markings (not shown) on the external surface of cylinder 32. Any excess material which has oozed from discharge outlet 34 is then removed. The thumb pad 18 is then released to disengage the forward faces 16a of bifurcated arm 17 from the face 11 of the T-shaped end 10 of the trigger lever 9. The trigger lever 9 is released by the operator and shaft 23 returns to its other limiting position under the influence of spring 26. The device is now ready for selecting the first dose. The cylinder 32 is screwed down the tube 30 to an extent depending upon the dose required. The trigger lever 9 is then actuated by the operator's fingers between the two limiting positions so that shaft 23 and its shaft head 25 displace piston 41 along the cylinder 32 to force material out of discharge outlet 34. The trigger lever 9 is released and the cylinder 32 screwed down tube 30 to an extent determined by the size of the next dose. The trigger lever 9 is then actuated in the same manner and the procedure repeated with successive doses until cylinder 32 is empty. The cylinder 32 may then be replaced with a charged cylinder.

When cylinder 32 is screwed down the threaded tube 30, it will be understood that the maximum volume of material that can be discharged from the cylinder 32 on each operation of the trigger lever 9 is the volume swept out by the piston 41 when being moved the same distance as lies between the two predetermined positions of the shaft 23. A dose volume less than the maximum can be discharged by positioning the cylinder 32 in the tube 30 to provide an intervening gap between the shaft head 25 and the piston 41 before operating the trigger lever 9. The volume of the substance ejected with each operation of the trigger lever 9 to move the shaft 23 between its two limiting positions will therefore vary with the distance which, before actuation, separates the shaft head 25 and the piston 41. It will be appreciated that having discharged from cylinder 32 a maximum dose, as explained above, the quantity of material which will be discharged upon the next actuation of the trigger lever 9 will depend upon the distance which the cylinder 32 is displaced axially relative to the threaded tube 30 by rotation of the cylinder 32 relative to the threaded tube 30 prior to the next actuation. If the maximum dose is required then the cylinder 32 should be rotated within the tube 30 to an extent such that axial displacement of the tube 32 brings the piston 41 into abutment with the shaft head 25. If an intervening gap is left between the shaft head 25 and the piston 41 prior to a discharge, then upon operation of the trigger lever 9, the piston 41 will not be displaced until the shaft head 25, comes into contact with the piston 41 and hence only displaces the piston 41 through the remaining distance of its movement to the limiting position.

It will therefore be appreciated that if an operator wishes, after initially leading the device, to dispense the first dose of a volume less than the maximum dose the device is capable of discharging, then it is imperative that immediately prior to the first discharge the shaft head 25 is not in abutment with the piston 41. The provision of the trigger lock mechanism, as hereinbefore defined, assists the operator in minimizing the risk occurring by locking the device in the actuated position. In order to dispense any material from the cylinder 32 after releasing the device from the locked condition the operator must then perform the positive action of screwing the cylinder 32 further down the tube 30 to an extent depending on the required dose.

What we claim is:

1. A device for dispensing liquid or semiliquid material from a screw-threaded cylindrical reservoir having a discharge opening and a piston, which device comprises a supporting structure having an actuating member arranged to move between two predetermined points to cause axial movement of said piston and the discharge of a dose of material from said reservoir, an operating member mounted on said supporting structure having an inoperative position and an actuated position, said operating member arranged to pivot between said inoperative position and said actuated position whereby to move said actuating member between said predetermined points, a lever pivoted to said supporting structure for locking the operating member in said actuated position, and a tubular structure mounted on said supporting structure and having a screw thread of uniform pitch for screw-threaded engagement with said screw-threaded reservoir.

2. A dispensing device as claimed in claim 1 wherein the screw thread of said tubular structure is internal of said tubular structure, the screw thread of said cylindrical reservoir is external of said structure whereby said tubular structure can receive said cylindrical reservoir by cooperation of said internal and external threads.

3. A device for dispensing liquid or semiliquid material from a cylindrical reservoir having a free piston arranged to slide in said reservoir having a discharge opening at one end and an externally screw-threaded portion of uniform pitch at its other end, which device comprises a supporting structure in the form of a gun having a handle, a barrel on said supporting structure, an actuating member on said supporting structure arranged to move axially in said barrel between two predetermined points to cause axial movement of said piston in said reservoir to discharge a dose of material through said discharge opening, a triggerlike operating member pivoted to said supporting structure and arranged to pivot between an inoperative position and an actuated position, a bellcrank lever pivoted to said supporting structure to lock said operating member in said actuated position, said barrel having an internal screw thread of uniform pitch for cooperation with said screw-threaded portion of said reservoir.

4. A device as claimed in claim 3 wherein said operating member has a T-piece at one end for cooperating with said actuating member, and said bellcrank lever has one end for operation by an operator and a bifurcated other end for engagement with said T-piece to lock said operating member in said actuated position.

5. A device for dosing animals with liquid or semiliquid material including a cartridge in the form of a cylinder for the material to be dispensed having a discharge opening at one end and an externally screw-threaded portion at its other end, a free piston arranged to slide within the cylinder to eject the substance through the discharge opening, the base diameter of said screw-threaded portion being not less than the external diameter of the remaining part of said cylinder, a supporting structure in the form of a gun having an internally screw-threaded barrel portion engaging said screw-threaded portion of said cylinder, whereby rotation of said cylinder relative to said barrel portion causes axial movement of said cylinder relative to said barrel, an actuating member on said supporting structure having predetermined movement axially of said cylinder independently of but capable of acting on said free piston, an operating member arranged to impart said predetermined axial movement to said actuating member upon pivoting of said operating member from an inoperative position to an actuated position, and a bellcrank lever pivoted to said supporting structure to lock said operating member in said actuated position.

6. A device as claimed in claim 5 wherein the operating member has a T-piece at one end for cooperating with said actuating member, and said bellcrank lever having one end for operation by an operator and a bifurcated other end for engagement with the T-piece to lock said operating member in said actuated position.